United States Patent
Ardesi et al.

(10) Patent No.: US 11,489,465 B2
(45) Date of Patent: Nov. 1, 2022

(54) CONTROL APPARATUS AND METHOD TO CONTROL A HIGH-POWER ELECTRIC MOTOR

(71) Applicant: DANIELI AUTOMATION S.P.A., Buttrio (IT)

(72) Inventors: Alessandro Ardesi, Udine (IT); Giuseppe Muscarnera, Siano (IT)

(73) Assignee: DANIELI AUTOMATION S.P.A., Buttrio (IT)

( * ) Notice: Subject to any disclaimer, the term of this patent is extended or adjusted under 35 U.S.C. 154(b) by 0 days.

(21) Appl. No.: 17/513,227

(22) Filed: Oct. 28, 2021

(65) Prior Publication Data

US 2022/0052630 A1  Feb. 17, 2022

Related U.S. Application Data

(63) Continuation of application No. PCT/IT2021/050055, filed on Mar. 10, 2021.

(30) Foreign Application Priority Data

Mar. 12, 2020 (IT) .................. 102020000005371

(51) Int. Cl.
*H02P 6/06* (2006.01)
*H02P 6/17* (2016.01)
*H02P 27/06* (2006.01)
*B03B 9/06* (2006.01)

(52) U.S. Cl.
CPC ............. *H02P 6/06* (2013.01); *B03B 9/061* (2013.01); *H02P 6/17* (2016.02); *H02P 27/06* (2013.01)

(58) Field of Classification Search
CPC ...... H02P 6/08; H02P 6/17; H02P 6/06; H02P 27/04; H02P 27/06
See application file for complete search history.

(56) References Cited

U.S. PATENT DOCUMENTS

| | | | | |
|---|---|---|---|---|
| 4,004,204 A | * | 1/1977 | Hoves | B02C 23/02 318/472 |
| 7,652,438 B2 | * | 1/2010 | Rosskamp | H02P 6/06 56/235 |
| 9,030,143 B2 | * | 5/2015 | Guzelgunler | H02P 29/68 318/471 |
| 10,476,421 B1 | * | 11/2019 | Khalil | H02P 6/17 |
| 10,812,007 B1 | * | 10/2020 | Fraser | H02P 29/026 |
| 2003/0155878 A1 | | 8/2003 | Murai | |
| 2015/0174586 A1 | | 6/2015 | Lipowski | |
| 2017/0187315 A1 | * | 6/2017 | Deguchi | H02P 25/0805 |
| 2019/0036336 A1 | * | 1/2019 | Kuznetsov | H02J 7/1423 |

OTHER PUBLICATIONS

International Search Report for corresponding application PCT/IT2021/050055 filed Mar. 10, 2021; dated May 11, 2021.
Written Opinion for corresponding application PCT/IT2021/050055 filed Mar. 10, 2021; dated May 11, 2021.

* cited by examiner

*Primary Examiner* — Thai T Dinh
(74) *Attorney, Agent, or Firm* — Cantor Colburn LLP

(57) ABSTRACT

Control apparatus and corresponding method for controlling a high power electric motor, preferably of the order of megawatts, preferably of or associated with a shredding plant which is preferably usable for shredding very bulky and heavy objects and is provided with a rotating shredding member connected to the rotor of the electric motor, where a control circuit is configured to control the electric motor so that it can operate selectively in different operating modes.

9 Claims, 3 Drawing Sheets

CONTROL APPARATUS AND METHOD TO CONTROL A HIGH-POWER ELECTRIC MOTOR

CROSS REFERENCE TO RELATED APPLICATION

This U.S. non-provisional patent application is a continuation of International Patent Application Number PCT/IT2021/050055 filed on 10 Mar. 2021, which claimed priority to Italian Patent Application Number 102020000005371 which was filed on 12 Mar. 2020, all of which said applications are herein incorporated by reference in their entirety.

TECHNICAL FIELD

The present disclosure concerns a control apparatus and method to control a high-power electric motor, preferably in the order of megawatts (MW), preferably, but not only, of a shredding or crushing plant, or able to be associated therewith. For example, the electric motor can be associated with a shredder device, usable for example for shredding very bulky and heavy objects, such as the bodies of vehicles, possibly already compacted, motors, mechanical members, household appliances, or other, and which therefore require a very high crushing force, in order to obtain scrap, for example metal, ferrous and non-ferrous, suitable to be then recycled, or recovered, for example to feed melting furnaces. The present disclosure can also be applied in the management of electric motors associated with other plants or equipment, for example for crushing and shredding other materials in different processes, such as for example paper, plastic, inert materials, wood, minerals, or other.

BACKGROUND

Especially in the steel industry, but not only, where there is the increasing problem of procuring raw materials for the production of new products and the associated need to recover as much as possible the materials coming from objects that are no longer used, for example ferrous materials from discarded objects, for example for the production of steel by melting furnaces, it is known to use shredding plants provided with shredding, or crushing devices, also known as shredders, to shred or crush even large and very heavy objects containing iron, such as for example the bodies of vehicles, household appliances, mechanical members, motors and more, possibly already reduced in volume by compaction in special presses.

Shredding plants first provide to crush and reduce the scrapped objects into small pieces and then to separate the various scrap from the processing waste, in particular by separating the metal scrap, both ferrous and non-ferrous, from the other scrap, so that it can then be destined to a new use.

The material to be treated usually first undergoes a volumetric reduction and then enters directly into the crushing chamber of the shredder device by means of a suitable conveyor belt.

The most common shredder devices normally comprise a rotating member, called a mill, essentially consisting of a rotating drum with which a plurality of crushing members, called hammers, are associated and which are configured to violently impact against the objects to be crushed.

Normally the rotation of the drum is advantageously commanded by a single electric motor of high nominal power (P), for example up to over 10 MW (about 13,400 hp), which is made to rotate at different speeds ($\omega$), depending on the torque (T) to be obtained for crushing the various objects to be crushed, based on the well-known formula $P=T\cdot\omega$. The working temperature of the motor (t) also has direct repercussions on the torque delivered, in a directly proportional manner.

Furthermore, since the productivity of the shredder device is directly proportional to the speed of rotation ($\omega$) of the electric motor connected to the rotating drum, it is obvious that in order to obtain high productivity, there is a tendency to make the rotating drum and therefore the electric motor operate at the highest possible speed of rotation.

The rotating drum has a large mass, so that once it has been made to rotate by the electric motor, it rotates by inertia, due to the flywheel effect, and the motor itself then only supplies it with the power input necessary to maintain the speed of rotation necessary to generate the kinetic energy required to crush, by impact, the objects or material to be crushed.

The crushed material exiting from the shredder device is collected on a second conveyor belt where the separation of the light fractions is carried out, for example by means of a flow of air, and subsequently passes into a section equipped with magnetic devices to separate the ferrous metals from the non-ferrous materials and from the inert and/or sterile materials. Each fraction is then collected in a specific container to be sent to other processes, or to storage.

The electric power supply of the electric motor is normally managed automatically by a control circuit in order to optimize the productivity of the plant.

However, said management is rather complex, especially in consideration of the considerable forces involved, which are very variable during the shredding process, as the type of materials to be treated can change a lot, as can their density. This entails different hardnesses and sizes of the objects fed, which create different resistances on the crushing hammers and therefore generate variable loads, or resistances to rotation, to which the electric motor is subjected, with the consequent fluctuation of the power required by the process.

The variability of the load, linked to the variability of the material fed, makes the shredder device substantially unpredictable from the point of view of the work cycle and therefore with regard to the electric power required by the process, which can even exceed the nominal performance of the motor itself.

Therefore, during these high-power transients, the motor generates current absorption peaks from the public or private electric network, with consequent disturbances or damage, even considerable, to the network itself.

FIG. 1 shows schematically how the work power transmitted by the electric motor to the rotating drum can be increased at most up to a value indicated by Pmax, corresponding to the intrinsic limits related to the characteristics of the electric motor, beyond which the latter would break. In FIG. 1 it can be noted that the speed of rotation $\omega$ of the electric motor associated with the rotating drum can increase ($\omega+$) or decrease ($\omega-$) with respect to a median nominal value.

When the crushing hammers hit more voluminous materials, following the greater resistance encountered by them, the number of revolutions of the rotating drum decreases.

If the torque is not increased, the available power decreases. This is disadvantageous, since the crushing hammers may not have the energy required to crush the material, resulting in a reduction in the productivity of the shredder device.

Therefore, to avoid a reduction in productivity, when the crushing hammers encounter harder or more voluminous materials, an attempt is made to increase the torque transmitted as well, causing the current absorption peaks as described above from the public network in the transients.

To try to transmit the maximum power supplied by the electric motor to keep productivity high, however, both the motor itself and the kinematic chain are heavily stressed, obliging installers to oversize these components, with a consequent increase in costs.

In order to try to limit these effects, shredder devices of the known type adopt protection systems which, however, do not give very satisfactory results.

One known solution provides to use an oil joint to transfer power between the electric motor and the mill, made in such a way as to protect the drive from overload and damp torsional vibrations.

Another solution is also known to try to reduce the damage due to uncontrolled overloads, which provides a liquid rheostat drive, of the type known as LRS (Liquid Resistance Starters), which consists of a power supply system for the electric motor in which the rotor of the latter is surrounded by a saline solution, therefore conductive, in which electrodes are disposed; the level of immersion in the liquid of the electrodes can be selectively adjusted to increase or decrease the conductivity between stator and rotor, so as to be able to vary the power that the mill requires from the electric motor. Adjustment is possible by using an amperometric transformer which detects the need for greater absorption and thus allows the variation in height of the electrodes inside the conductive saline solution.

This known system allows to partly damp the uncontrolled absorption peaks, protecting the electric motor (with losses of 8-9% of the power in heat). However, this intervention capacity is limited from the point of view of the response speed over time (2-3 seconds) and in any case does not prevent a waste of energy, which causes the dissipation of power in the "Liquid Starter".

In any case, with this known solution, the phenomenon of power peaks is not completely eliminated, and therefore it is still necessary to oversize the electric motor: for example, in order to work properly without excessive risks of being ruined by high-power peaks, an electric motor with a nominal power of 3,700 kW (about 5,000 hp) is obliged not to exceed 65-70% of the nominal power as above, and therefore it can work on average at about 2,500 kW (about 3,350 hp).

This solution is not very efficient, since it is not possible to fully exploit the power of the engine, nor, consequently, to transmit all the energy available to the hammers to crush the material, thus considerably limiting the performance of the plants and overall productivity.

Document U.S. Pat. No. 1,047,642 B1 describes a control system for a switched reluctance motor, which is able to select between a plurality of operating modes to control the current supplied by an inverter to the motor, based on: motor speed, transient speed, power of the motor, in which the operating modes comprise a current regulation mode, a single pulse mode and a continuous conduction mode. In particular, the solution described in U.S. Pat. No. 1,047,642 B1 provides to compare the motor speed with a first threshold value to determine whether to control the motor with the current regulation operating mode or with the single pulse operating mode and, if the motor speed exceeds the nominal threshold value, provides to keep the power constant by making the motor function in a de-fluxing zone, that is, by reducing the magnetic flux of the motor. This operating mode allows to increase the speed considerably, but requires an increase in current to compensate for the reduction in flux, which can lead to unwanted power peaks. This solution does not allow to maximize the use and efficiency of the motor.

Known solutions also have the disadvantage of being strictly dependent on the network and electric current available, and therefore in territories or countries where the electric current is limited, it is necessary to reduce the nominal power of the motors.

One purpose of the present disclosure is to provide a control apparatus and an associated method to control a high-power electric motor, preferably in the order of megawatts (MW), preferably, but not only, of a shredding or crushing plant, or able to be associated therewith, which is able to allow the electric motor to transfer the maximum energy available to the motor in any situation.

In particular, one purpose is to provide a control apparatus and method that allow the motor to be used at its nominal power without the risk of having power peaks, associated with variations in load, which could cause serious problems and/or damage to the network that supplies the electric current to the motor.

Another purpose of the present disclosure is to provide a control apparatus and associated method to control a high-power electric motor, which allows to obtain a high speed of rotation of the rotor of the electric motor, and therefore of the rotating member associated therewith, which provides a high productivity of the shredding plant in relation to the power delivered and the torque applied to the rotating member itself.

Yet another purpose of the present disclosure is to provide a control method and apparatus that allow to maximize the torque applied.

Another purpose is to provide a control method and apparatus that can be applied both in existing shredding plants, in order to improve their performance and increase overall efficiency, by fully exploiting the nominal power of the motor, and also in newly constructed plants, allowing a correct sizing of the motors themselves according to requirements, also correlated to the electric energy available.

The Applicant has devised, tested and embodied the present disclosure to overcome the shortcomings of the state of the art and to obtain these and other purposes and advantages.

BRIEF SUMMARY

A control apparatus is provided for controlling a high power electric motor, preferably of the order of megawatts (MW), preferably of, or associated with, a shredding plant, which is preferably usable for shredding very bulky and heavy objects and is provided with rotating shredding means connected to the rotor of the electric motor, comprises electric power supply means associated with the electric motor to selectively power it with a voltage and a current so that the electric motor can operate at a selected temperature, supply the power as above, rotate at a suitable rotation speed and apply to the rotating shredding means a determinate torque necessary for shredding the objects, and a control circuit connected to the electric power supply means as above and configured to control the electric motor so that it selectively operates at the temperature as above, supplies the power as above, rotates at the rotation speed as above and applies the torque to the rotating shredding means as above.

According to a characteristic aspect of the present disclosure, the control circuit as above comprises selection means configured to select the supply of the voltage and current as above so that the electric motor can operate selectively in any one of the following three operating modes: a first operating mode, with a constant rotation speed, and with a power limited to a selected value; a second operating mode, with a constant power, and with a torque limited to a selected value greater than or equal to a nominal torque value; a third operating mode, with a constant torque, and at a temperature of the electric motor limited to a selected value.

According to some embodiments, the control circuit is configured to select the supply of the voltage and current as above in relation to the type of load of the shredding means, in order to return the electric motor to operate, or maintain it operating, in the second operating mode at constant power.

According to some embodiments, in the second operating mode the motor operates with a nominal magnetic field flux value substantially equal to the nominal flux value it has in the first operating mode. In other words, the magnetic flux of the motor always remains around the nominal value and does not reduce with increasing speed.

In accordance with some embodiments of the present disclosure, the selection means comprise an inversion circuit, or inverter.

In accordance with other embodiments of the present disclosure, the inverter can comprise a plurality of thyristors.

The possibility of adapting the functioning of the motor with the selection means allows to increase and reduce the electric current in order to increase and reduce the speed and/or the torque of the hammers as a function of operational requirements, in order to guarantee the transfer of the maximum available energy to the scrap. In fact, thanks to the inverter devices, it is possible to obtain a dynamic functioning process, which can adapt in real time to the type/quantity of load to be crushed and to the requirements of the electricity grid.

In accordance with some embodiments of the present disclosure, the electric motor is electrically powered by medium voltage (MV) electric power supply means, and between the latter and the electric motor there is interposed an electric transformer configured to transform the electric voltage from medium (MV) to medium-low (LV), and connected to the control circuit.

According to some embodiments, the electric motor is provided with one or more detection devices suitable to detect one or more functioning parameters, selected from rotation speed, torque, absorbed electric current, temperature.

In accordance with other embodiments of the present disclosure, the control circuit also comprises a programmable electronic control unit, configured to command the electric motor in one of the three operating modes, also on the basis of feedback signals that reach it from the detection devices of the electric motor.

In accordance with some embodiments of the present disclosure, in the first operating mode the power absorbed by the electric motor reaches a set maximum power level, preferably comprised between 105% and 115%, for example 110%, of the nominal power of the electric motor.

In accordance with some embodiments of the present disclosure, in the third operating mode the maximum torque, corresponding to the maximum operating temperature of the electric motor, is set at a value preferably comprised between 140% and 160%, for example at 150%, of the nominal value.

The present disclosure also concerns a control method to control a high power electric motor, preferably of the order of megawatts (MW), preferably of or associated with a shredding plant which is preferably usable for shredding very bulky and heavy objects and is provided with rotating shredding means connected to the rotor of the electric motor, by means of a control apparatus which comprises electric power supply means associated with the electric motor in order to selectively power it with a voltage and a current so that the electric motor can operate at a selected temperature, supply the power, rotate at a suitable rotation speed and apply to the rotating shredding means a determinate torque necessary for shredding the objects, and a control circuit connected to the electric power supply means and configured to control the electric motor so that it selectively operates at the temperature as above, supplies the power as above, rotates at the rotation speed as above and applies the torque to the rotating shredding means as above.

The method according to the disclosure comprises at least a first step in which the control circuit controls the electric motor so that it operates at least in a first operating mode, with a constant rotation speed, and with a power limited by a set maximum power value.

According to some embodiments, upon reaching the maximum power value, it provides to select the supply of the voltage and of the current so that the electric motor can selectively operate in at least one of either a second operating mode with a control at constant power, and with a torque limited to a selected value greater than or equal to a nominal torque value, or a third operating mode, with a control at constant torque, and with a temperature of the electric motor limited to a selected value.

The three operating modes can be selected on each occasion as a function of the type and quantity of scrap to be crushed, and/or the limits of electrical energy available in the power supply network, in order to modify the functioning parameters of the motor in terms of power, speed and torque, so as to always transfer the maximum available energy to the scrap.

In particular, it is possible to make the motor function at the nominal power for most of the time, or even at a value higher than it, by setting it as a constant parameter, and adjust the speed and torque accordingly, in order to obtain both an increase in the efficiency of the plant, thanks to the fact that the entire available power of the engine is exploited, and also the transfer of the maximum available energy.

This solution allows to maximize, at every moment, the energy transferred to the scrap to be shredded, efficiently exploiting the potential of the electric motor, at the limit of its thermal capacity, without compromising its correct functioning.

According to some embodiments of the present disclosure, the method provides to make the motor work substantially always with a constant magnetic field flux value substantially equal to the nominal flux value, in each operating mode.

According to some embodiments, the method provides to make the motor function at variable load and at constant power, but in torque overload, that is, with a set maximum torque value higher than a nominal torque value, preferably comprised between 140% and 160%, for example 150%, of the nominal value, at least in the second and possibly in the third operating mode.

According to other embodiments, the method according to the disclosure provides to regulate the supply voltage and current of the motor in such a way as to keep it in, or return it to, the second operating mode.

The maximum torque value can be set as a function of a maximum temperature that the motor can reach.

The method according to the disclosure can provide to keep the temperature value of the motor continuously monitored, in order to suitably regulate the voltage and current values supplied to the motor. Furthermore, this solution, since it allows to control the functioning of the motor, in particular torque and speed, in real time, allows to work even in conditions of overload of the scrap containing chamber, so as to also exploit the energy transfer between the scrap itself.

The control apparatus and method, if applied to existing plants, allow to considerably improve the overall efficiency of the plant, while in the case of newly built plants they allow to size the motors on the basis of real needs, no longer having to compensate any power peaks.

BRIEF DESCRIPTION OF THE DRAWINGS

These and other aspects, characteristics and advantages of the present disclosure will become apparent from the following description of one embodiment, given as an example, which does not restrict the field and scope of protection, with reference to the attached drawings wherein.

DETAILED DESCRIPTION

We will now refer in detail to the possible embodiments of the present disclosure, shown in the attached drawings. These examples are supplied by way of illustration of the present disclosure and shall not be understood as a limitation thereof.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
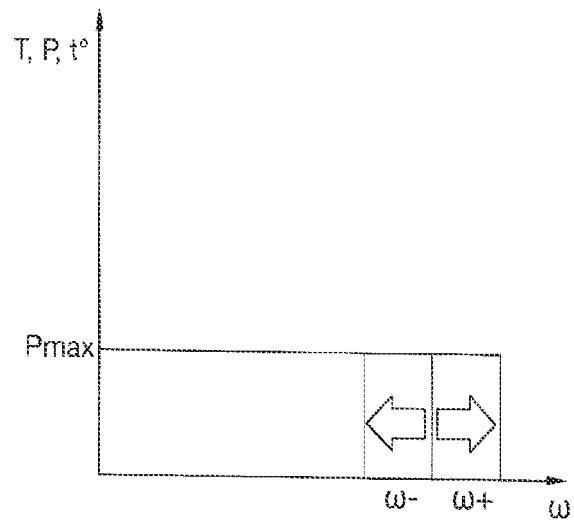
FIG. 1, as seen above, is a known graph that schematically shows the relation between the rotation speed ($\omega$) of the rotor of an electric motor and the power (P), torque (T) and temperature (t) parameters of the rotor.
Figure 2:
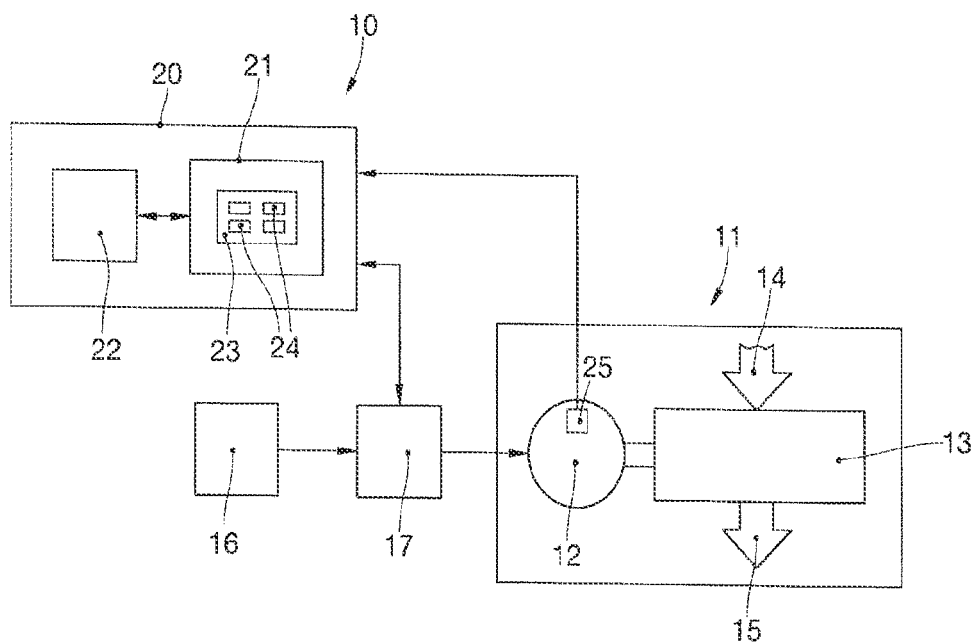
FIG. 2 is a block diagram of a control circuit according to the present disclosure associated with a shredding plant.

With reference to FIG. 2, a control apparatus 10 according to the present disclosure is shown associated with a shredding plant 11 of a known type, having an electric motor 12, the rotor of which is connected, for example by means of an extension, to a rotating drum, or mill, 13, provided with crushing hammers, of a known type and not shown in the drawings.

The rotating drum 13 is associated upstream with a device 14 for introducing objects, or material, to be shredded and downstream with a device 15 for collecting the shredded pieces.

The shredding plant 11 is connected to electric power supply means 16 of a known type, consisting for example of a medium voltage (MV) electricity grid, capable of supplying indicatively an electric voltage from 11 to 20 KV with a power (P) of up to about 10-15 MW.

Between the electric power supply means 16 and the electric motor 12 there is interposed an MV/LV electric transformer 17, configured to transform the electric voltage from medium (MV) to low (LV), indicatively, in the example given here, to a value comprised between about 300 and 700 V, with a power of about 3-3.5 MW.

The control apparatus 10 comprises a control circuit 20, connected to the electric transformer 17 and provided with selection means 21 controlled by a programmable electronic control unit 22, for example a PLC, also on the basis of suitable feedback signals coming from the electric motor 12 and indicative at least of the torque T, the power P and the rotation speed $\omega$.

According to some embodiments, the programmable control unit 22 can receive the feedback signals detected and/or monitored in real time by one or more detection devices 25 associated with the electric motor 12. According to some embodiments, the detection device/s 25 can comprise sensors suitable to detect one or more of either torque, rotation speed, absorbed electric current, or motor temperature.

The detection devices 25 comprise in particular at least temperature sensors suitable to detect the temperature of the electric motor 12 and send the detected values to the control circuit 20 and/or to the programmable electronic control unit 22.

Figure 5:
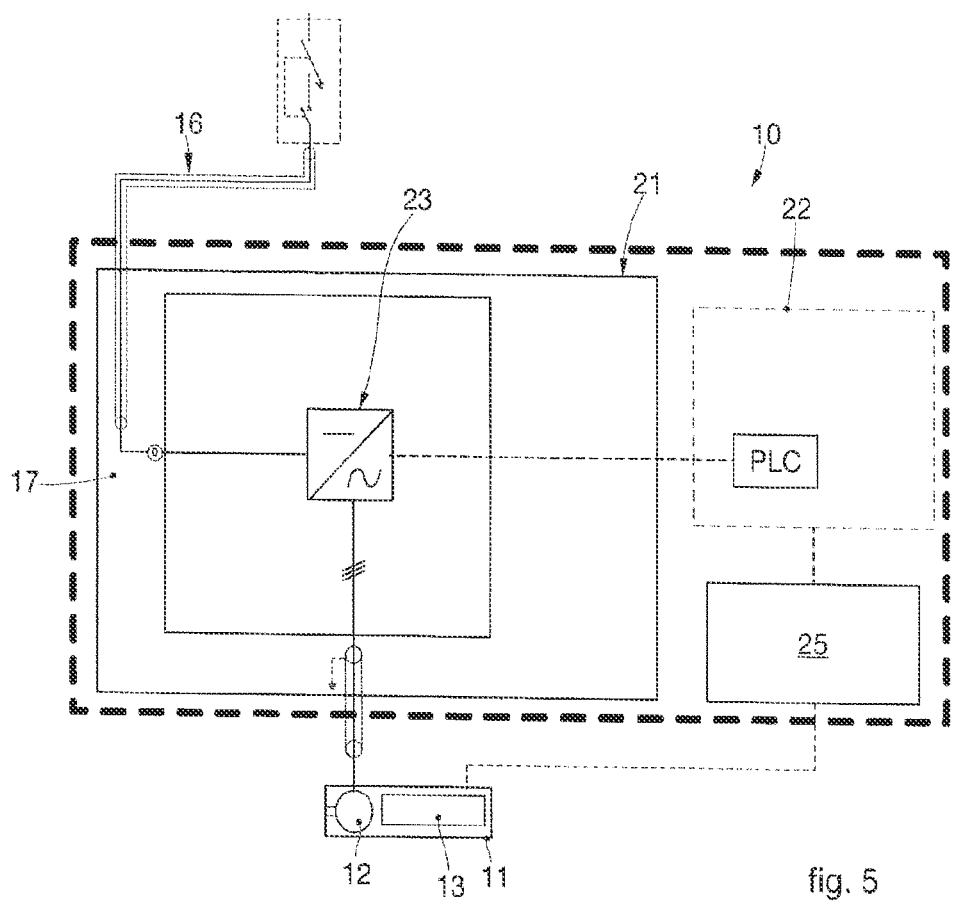
FIG. 5 is a schematic representation of the control circuit of FIG. 2.

The selection means 21 comprise, for example, an inversion circuit, or inverter, 23 which in turn preferably comprises a plurality of thyristors 24 (FIGS. 2 and 5).

The control circuit 20 is configured to actively manage the control parameters of the electric motor 12 (power P, torque T, rotation speed $\omega$) thanks to the inverter 23 and the programmable electronic control unit 22. All this in a dynamic manner, taking full advantage of the potential of the electric motor 12 in terms of percentage of the maximum torque that can be supplied in permanent thermal regime.

In particular, the control circuit 20 is capable of separating the electric motor 12 from the electric power supply means 16, that is, from the electricity grid, so as to be able to control the currents at exit from the inverter 23 and power the electric motor 12 in a controlled manner, preventing stresses on the kinematic chain and disturbances on the electricity grid itself.

In particular, the control apparatus 10 allows to operate in three different control operating modes.

A first operating mode A basically provides a control at constant rotation speed ω, with a limit on power P.

In this first operating mode A, the rotation speed w is the control parameter and is kept constant. Therefore, its value is numerically fixed through automation and can be selectively set to try to achieve maximum productivity, since the rotation speed w is directly proportional to the productivity of the shredding plant 11.

For set values of high rotation speed w based on the formula P=T·ω, the torque T and the power P also increase, up to a set power limit Pmax, which is the limit that cannot be passed in order to not damage the electric motor 12.

Figure 3:
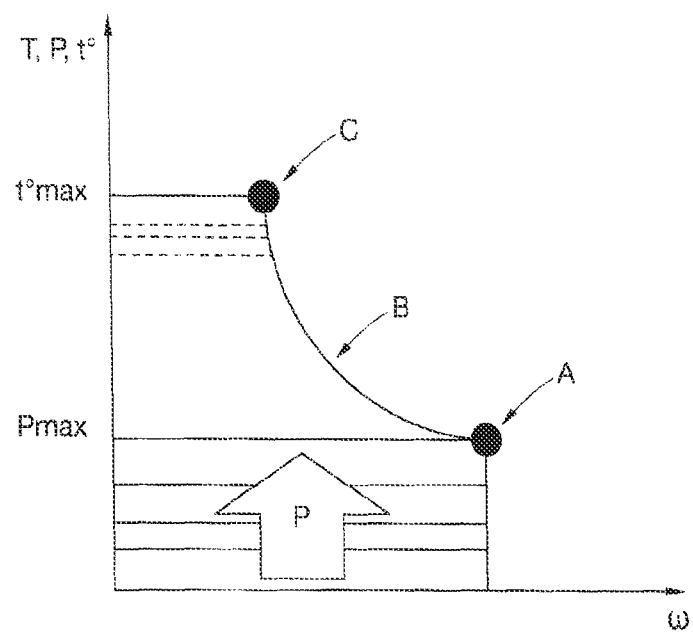
FIG. 3 is a graph that briefly represents the trend of the rotation speed ($\omega$) of the rotor of the electric motor used in the shredding plant of FIG. 2, in relation to the corresponding power (P), torque (T) and temperature (t°) parameters of the rotor according to the three modes, A, B and C, for controlling the electric motor according to the present disclosure, respectively at a constant rotation speed ($\omega$), at constant power (P) and constant torque (T)

The power P absorbed by the electric motor 12 reaches the set maximum power level Pmax, preferably comprised between 105% and 115%, for example 110% of the nominal power P of the electric motor 12, which corresponds to point A in FIG. 3. Beyond this limit, the electric motor 12 would be damaged. In fact, it would be possible to go over this limit only with an oversizing of the electric motor, as is done in the prior art. However, the present disclosure does not provide this oversizing but provides to pass, in an automatic and programmed manner, to a subsequent second operating mode B.

The second operating mode B basically provides a control at constant power P, with a limit on the torque T.

In this second operating mode B, the power P is the control parameter and is kept constant, so that the torque T, which increases, and the rotation speed ω, which decreases to keep the power P constant, become variable.

In particular, in the second operating mode B the power P is substantially kept constant at the set maximum power value Pmax, or in any case at a value lower than this.

The torque T is increased by increasing the current absorption. A higher current leads to an increase in the specific energy passing through the electric motor 12, according to the formula $I^2 t$, where "I" is the effective value in amperes of the short-circuit current and "t" is the duration of the current, with a consequent increase in the temperature t° of the electric motor 12.

Therefore, advantageously, the temperature t° of the electric motor 12 is measured and its value is sent to the control circuit 20 in order to take full advantage of the potential of the electric motor 12, at the limit of its thermal capacity so as not to compromise its correct functioning.

Therefore, by keeping the power P below, or at most equal to, the set maximum value Pmax, it is possible to increase the torque transmitted by the electric motor 12 to the rotating drum 13 as a function of the temperature t° of the electric motor 12, up to at a maximum torque level T set to correspond to the maximum temperature t° max that can be reached by the electric motor 12 without it being damaged, according to the characteristics of its build.

In this second operating mode B at constant power (central zone of FIG. 3), the following advantages are obtained:

productivity increases by 25%-30%;
no current absorption peaks occur on the side of the electric power supply means 16;
maximum energy is transferred on the side of the rotating drum 13;
the electric motor 12 is not thermally stressed.

With the control circuit 20 and with the inverters 23, moreover, it is also possible to control the switching on and off of the feeder rollers that feed the scrap to the crushing plant, as well as their speed, in such a way as to keep the engine power constant at the fixed value and transfer the maximum possible energy to the scrap.

According to some embodiments, the second operating mode B with constant power limit allows to adapt the functioning of the electric motor 12 also as a function of the electric energy available. In fact, in the event a limit equal to 120% of the nominal power cannot be set, but it is necessary to limit it to 80%, in the second operating mode B it will still be possible to make the motor 12 work with a torque T variable between 100% and 150% of the nominal torque, regardless of the power.

The third operating mode C provides a control substantially at constant torque T, with a limit on the temperature t° of the electric motor 12.

When the maximum transmissible torque T is reached, which corresponds to the maximum temperature t° max that can be safely reached by the electric motor 12, the torque T becomes the control parameter that is kept constant, allowing the possibility for the rotation speed ω and the power P to vary, in particular to decrease.

The amount of time during which the electric motor 12 can work in this condition depends on the use percentage of the torque T with respect to the nominal value, and on the previous functioning history of the electric motor 12 itself, which affects its temperature state.

When the torque T limit is reached and the control is performed as a function of the temperature t°, subsequently the control method provides to limit the electric power supply to the electric motor 12.

According to some embodiments, it can be provided that after a certain time interval during which operations are carried out in the third operating mode, the supply current supplied to the electric motor 12 is reduced in such a way as to bring the operating parameters of torque T, rotation speed ω and power P back within the values provided in the second operating mode B (see the graph in FIG. 3).

In particular, unlike what normally occurs in known solutions, the method according to the disclosure provides to work initially with a speed control, so as to increase the power up to the maximum value Pmax, and subsequently pass to a control at constant power set at the value Pmax by progressively increasing the torque T up to the set limit.

According to some embodiments, the voltage and current values supplied to the motor can be regulated in such a way as to keep the electric motor 12 in the second operating mode.

Figure 4:
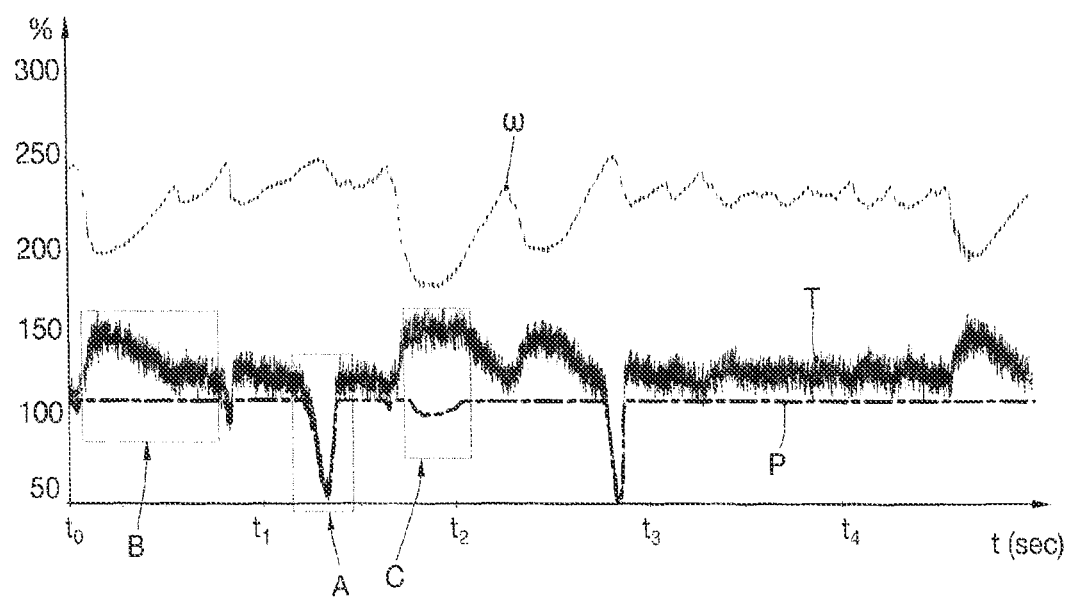
FIG. 4 is a graph that briefly represents an example of the trend over time (t) of the following three parameters in the three operating modes, first A, second B and third C, for controlling the electric motor of FIG. 3: rotation speed ($\omega$) (upper dashed curve), in revolutions per minute (rpm); power (P) (lower dash-dot curve), as a percentage of the nominal power of the electric motor; torque (T) (central continuous line curve), also as a percentage of the nominal torque of the electric motor.

The graph of FIG. 4 shows a real recording, on a functioning shredding plant 11, of the three control parameters, namely power P, torque T and rotation speed ω during a shredding process, with the three operating modes A, B and C.

In particular, the graph of FIG. 4 shows at the top (upper dashed curve) the trend of the rotation speed ω in revolutions per minute (rpm), in the central part, with a continuous line, the torque T as a percentage and at the bottom, dashed-dot line, the power P also as a percentage with respect to the nominal power of the electric motor 12.

The functioning of the control apparatus 10 described heretofore, which also corresponds to the control method according to the present disclosure, provides a first step in which the control circuit 20 controls the electric motor 12 according to the first operating mode A, therefore the rotation speed ω is set to increase until the maximum power threshold is reached (Pmax in FIG. 3).

Upon reaching this threshold, the control circuit 20 passes to a second step in which the second operating mode B is adopted, therefore the power P remains at a fixed value, for example the maximum power value Pmax, preferably comprised between 105% and 115%, for example at 110%, of the nominal power P.

The second operating mode B allows to take full advantage of the power of the electric motor 12, so that, as can be seen in FIG. 4, the lower dash-dot line never exceeds this threshold value of 110% and is kept substantially constant, considerably raising the average value of the power used compared to known solutions, until it almost reaches the nominal value.

As previously described, in the second operating mode B, as the torque T transmitted increases, the temperature t° of the electric motor 12 also increases, until the maximum torque T transmissible at the maximum working temperature (t° max in FIG. 3) of the same electric motor 12 is reached.

According to some embodiments, in the second operating mode B the electric motor 12 always works with a constant magnetic flux value, substantially equal to the nominal flux value.

Upon reaching the maximum working temperature, the control circuit 20 passes to a third step in which the third operating mode C is adopted.

According to some embodiments, the torque value T in the second B and in the third operating mode C is greater than or equal to a nominal torque value.

In the graph of FIG. 4, the maximum torque T, corresponding to the maximum operating temperature (t° max) of the electric motor 12, is set to a value preferably comprised between 140% and 160%, for example 150%, of the nominal value.

When the type of material to be shredded, loaded into the rotating drum 13 (FIG. 2) by means of the introduction device 14, is such that it allows to drop below the torque T limit set by the control circuit 20, there is a return to the scope of work of the second operating mode B, which is the ideal mode in which the machine should be made to work, since it is the area in which the electric motor 12 supplies the maximum power P without exerting effort, but in which it is also possible to obtain the highest productivity. This operating mode varies between point A which corresponds to the maximum rotation speed ω of the electric motor 12 and therefore of the rotating drum 13 and the lower torque T, and point C which corresponds to the maximum torque T and the minimum rotation speed ω at equal power P.

In order to switch from the third operating mode C to the second operating mode B it is possible to act through the inverter 23 to reduce the electric current supplied.

According to some embodiments, the method according to the disclosure provides to make the electric motor 12 work with a constant magnetic field flux value, substantially equal to the nominal flux value, in each of the operating modes A, B, C.

Figure 6:
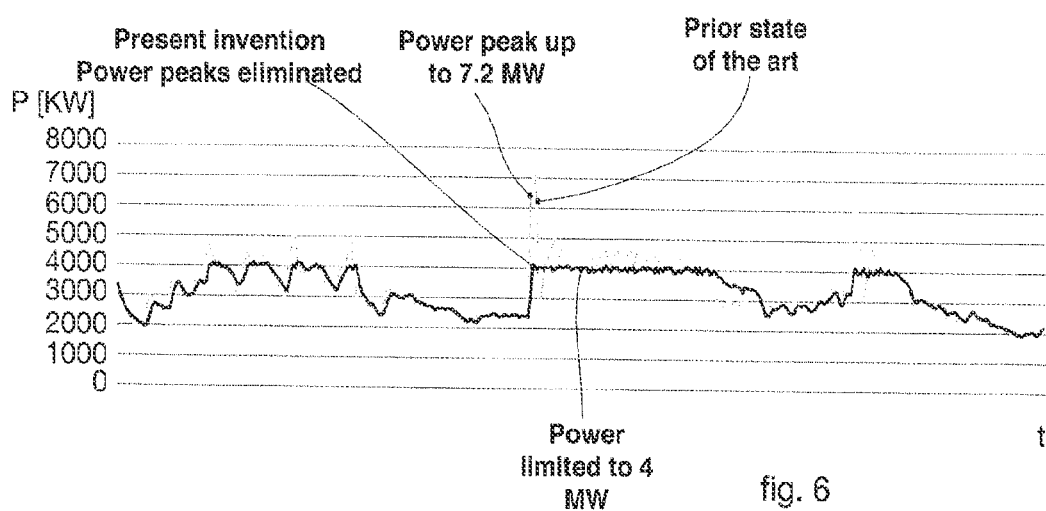
FIG. 6 is a graph that represents the trend over time (t) of the power (P) supplied by an electric motor controlled by a control circuit of the present disclosure (lower curve with solid black line), compared to that controlled according to the previous state of the art (upper gray curve).

The graph of FIG. 6 represents the result of a comparative study between the trend of the power P, limited to a maximum value of 4 MW and supplied in time (t) by the electric motor 12 controlled by the control circuit 20 (lower solid line curve), in which there is no anomalous power peak, and that of the power P supplied in time (t) by an electric motor according to the state of the art (upper dashed curve), in which it can be seen that in the latter case there are two uncontrolled power peaks, the highest of which had a value of 7.2 MW.

As is evident from the graph of FIG. 6, while in the case of the prior art it is necessary to provide an oversized electric motor, with a nominal power greater than 7.2 MW, thanks to the present disclosure, with the same performance, it is possible to use an electric motor with nominal power equal to, or even lower than, 4 MW, with consequent cost savings in production and consumption.

Furthermore, with the control apparatus 10 according to the present disclosure, the reaction of the control circuit 20 to the variations in the load to which the electric motor 12 is subjected is substantially immediate, of the order of a few milliseconds, compared to the time of a few seconds (from 2 to 3) of the prior art, for example with a known LRS.

It is clear that modifications and/or additions of parts or steps may be made to the control apparatus 10 and method as described heretofore, without departing from the field and scope of the present disclosure as defined by the claims.

It is also clear that, although the present disclosure has been described with reference to some specific examples, a person of skill in the art shall certainly be able to achieve many other equivalent forms of apparatus 10 and method for controlling a high power electric motor, preferably of the order of megawatts (MW), preferably of a shredding, or crushing, plant, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A control method to control a high power electric motor associated with a shredding plant for shredding bulky and heavy objects and provided with rotating shredding means connected to a rotor of said electric motor, by means of a control apparatus which comprises electric power supply means associated with said electric motor to selectively power the motor with a voltage and a current so that said electric motor operates at a selected temperature, supplies said power, rotates at a selected rotation speed and applies to said rotating shredding means a determinate torque necessary for shredding said objects, and a control circuit connected to said electric power supply means and configured to control said electric motor so that the motor selectively operates at said temperature, supplies said power, rotates at said rotation speed and applies said torque to said rotating shredding means, the method comprising a first step in which said control circuit controls said electric motor so that the motor operates in a first operating mode, with a constant rotation speed, and with a power limited by a set maximum power value, and wherein, upon reaching said maximum power value, selecting the supply of said voltage and said current so that said electric motor can selectively operate in one of either a second operating mode with a control at constant power, and with a torque limited to a selected value greater than or equal to a nominal torque value, or a third operating mode, with a control at constant torque, and with a temperature of said electric motor limited to a selected value.

2. The control method as in claim 1, wherein in said second operating mode, increasing the torque applied to said electric motor by increasing the electric current absorbed by said electric motor.

3. The control method as in claim 1, wherein upon reaching said maximum power value, selecting and maintaining said second operating mode until the torque of said electric motor reaches a maximum transmissible torque value corresponding to a predefined reachable maximum temperature.

4. The control method as in claim 1, wherein in said third operating mode maintaining said torque constant and decrease said rotation speed and said power.

5. The control method as in claim 1, further comprising controlling said electric motor with said first operating mode until the power absorbed by said electric motor reaches a set maximum power level comprised between 105% and 115% of the nominal power of said electric motor.

6. The control method as in claim 1, wherein in said third operating mode the maximum torque, corresponding to the maximum operating temperature of said electric motor, is set at a value comprised between 140% and 160% of the nominal value of said torque.

7. The control method as in claim 1, wherein upon reaching a torque limit correlated to said selected temperature value in said third operating mode, or when the third operating mode has remained operational for a predefined period of time, providing to reduce the electric power supplied to said electric motor so that said electric motor returns to function in said second operating mode.

8. The control method as in claim 1, further comprising making said electric motor work with a constant magnetic field flux value, substantially equal to a nominal flux value, in each of said operating modes.

9. The control method as in claim 1, further comprising detecting, substantially continuously, the temperature of said motor and to send on each occasion the value detected to said control circuit, in order to suitably regulate said voltage and said current to take full advantage of a potential of said electric motor, at the limit of a thermal capacity, without compromising correct functioning.

* * * * *